United States Patent
Hiel et al.

(10) Patent No.: US 7,218,011 B2
(45) Date of Patent: May 15, 2007

(54) DIFFUSER-AUGMENTED WIND TURBINE

(75) Inventors: Clement Hiel, Rancho Palos Verdes, CA (US); George J. Korzeniowski, Woodland Hills, CA (US)

(73) Assignee: Composite Support & Solutions, Inc., Rancho Palos Verdes, CA (US)

( * ) Notice: Subject to any disclaimer, the term of this patent is extended or adjusted under 35 U.S.C. 154(b) by 233 days.

(21) Appl. No.: 10/826,494

(22) Filed: Apr. 16, 2004

(65) Prior Publication Data
US 2005/0002783 A1    Jan. 6, 2005

Related U.S. Application Data

(60) Provisional application No. 60/466,124, filed on Apr. 16, 2003.

(51) Int. Cl.
*F03B 13/00*    (2006.01)

(52) U.S. Cl. .............................. 290/43; 290/44; 290/55; 415/2; 415/121

(58) Field of Classification Search .................. 290/43, 290/54, 44, 55; 415/2, 121, 4, 147
See application file for complete search history.

(56) References Cited

U.S. PATENT DOCUMENTS

| | | | |
|---|---|---|---|
| 4,075,500 A * | 2/1978 | Oman et al. ................... | 290/55 |
| 4,204,799 A * | 5/1980 | de Geus ....................... | 415/4.5 |
| 4,324,985 A | 4/1982 | Oman | |
| 4,482,290 A | 11/1984 | Foreman et al. | |
| 4,684,316 A | 8/1987 | Karlsson | |
| 4,720,640 A * | 1/1988 | Anderson et al. ............. | 290/43 |
| 6,836,028 B2 * | 12/2004 | Northrup et al. ............. | 290/44 |
| 2004/0005226 A1 | 1/2004 | Smith, III | |

\* cited by examiner

*Primary Examiner*—Darren Schuberg
*Assistant Examiner*—Iraj A. Mohandesi
(74) *Attorney, Agent, or Firm*—Christie, Parker & Hale, LLP

(57) ABSTRACT

A diffuser-augmented wind-turbine assembly in which the diffuser has a cylindrical central section rotatably supporting a rotor drum which in turn supports turbine blades without requiring a central support shaft. Wind energy drives the turbine blades and rotor drum, which in turn drive a generator of electrical power.

7 Claims, 6 Drawing Sheets

DIFFUSER-AUGMENTED WIND TURBINE

CROSS-REFERENCE TO RELATED APPLICATION

This application claims the benefit of U.S. Provisional Application 60/466,124 filed Apr. 16, 2003.

BACKGROUND OF THE INVENTION

Wind turbines are in widespread use for the generation of electrical energy. In a typical form, a multi-blade turbine is rotatably mounted on a support such as a pole or tower to be driven by surface winds, the turbine in turn driving an electrical generator coupled, for example, to electrical utility lines. The turbine can be rotated about a vertical axis of the pole or tower to compensate for shifts in wind direction.

The use of diffusers with wind turbines is also known, the objective being to increase the efficiency of converting wind energy to electrical energy. Such known diffusers are typically mounted on the support tower, and a shaft-mounted turbine rotates within the diffuser. Such an arrangement is disclosed in U.S. Pat. No. 4,075,500, which, for brevity, is incorporated herein by reference.

The improvement of this invention relates to integration of the turbine blades with a surrounding hollow cylindrical-shell rotor drum, the drum in turn being rotatably supported within a central part of the surrounding diffuser. A central hub and supporting shaft for the turbine blades is eliminated, and blade stiffness is significantly increased. The blades and rotor drum can be cast, or injection molded in a single manufacturing step.

SUMMARY OF THE INVENTION

A diffuser-augmented wind turbine for generating electrical power, and having a diffuser outer-housing shell with a cylindrical portion rotatably supporting a rotor drum having an inner surface rigidly supporting a plurality of turbine blades, the rotor drum being in driving engagement with a rotatable electrical generator. The device can also be operated in reverse as a wind-generating fan by supplying electrical energy to the generator to act as a motor.

DESCRIPTION OF THE PREFERRED EMBODIMENTS

Figure 1:
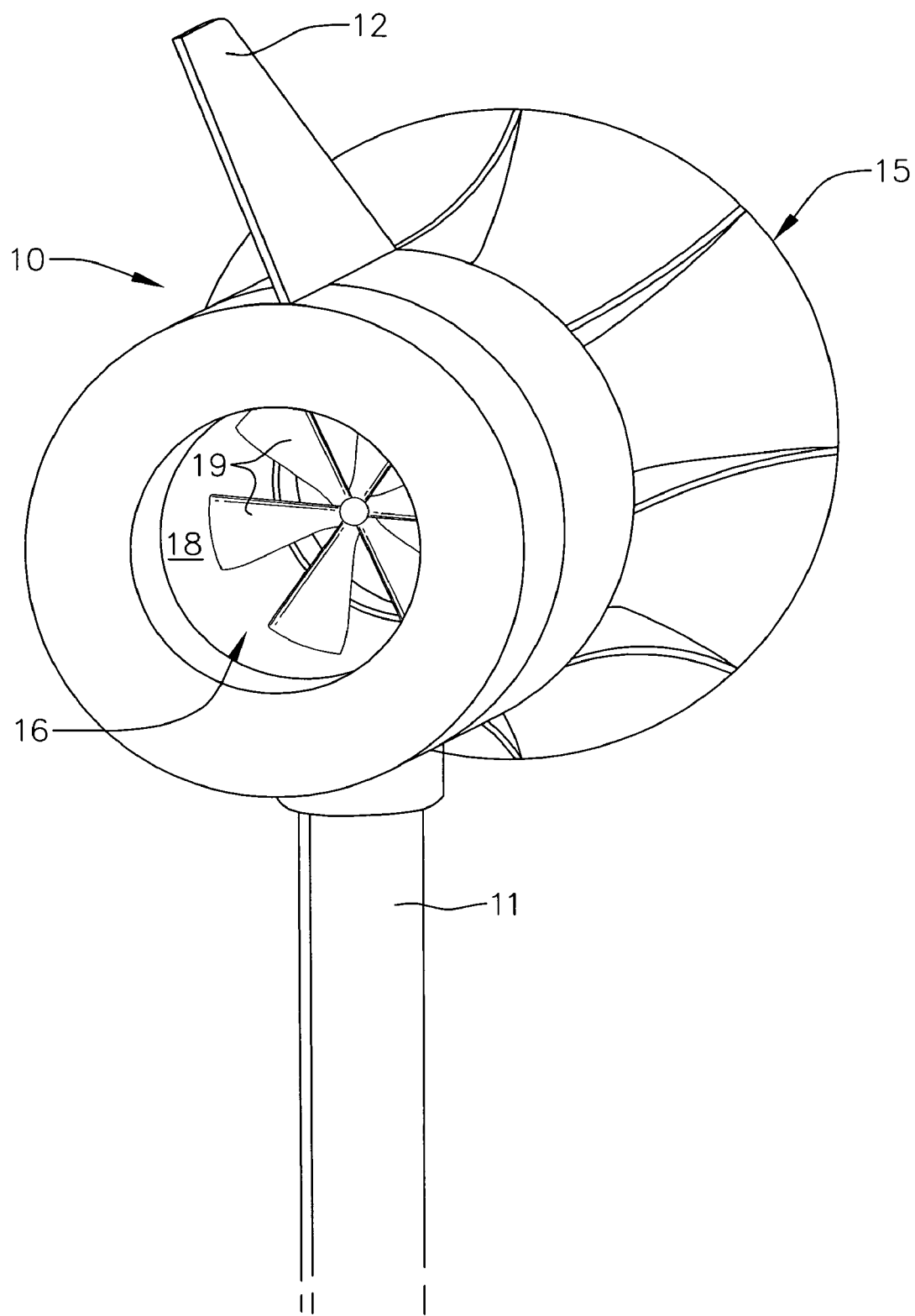
FIG. 1 is a perspective view of a pole-mounted wind-turbine assembly according to the invention.

FIG. 1 shows a diffuser-augmented wind-turbine assembly 10 according to the invention, and rotatably mounted on a conventional support pole 11 so it can be moved by a fin 12 to compensate for shifting wind directions. The assembly has an outer diffuser shell 15, within which can be seen a blade and rotor-drum assembly 16 as described in greater detail below.

Figure 2:
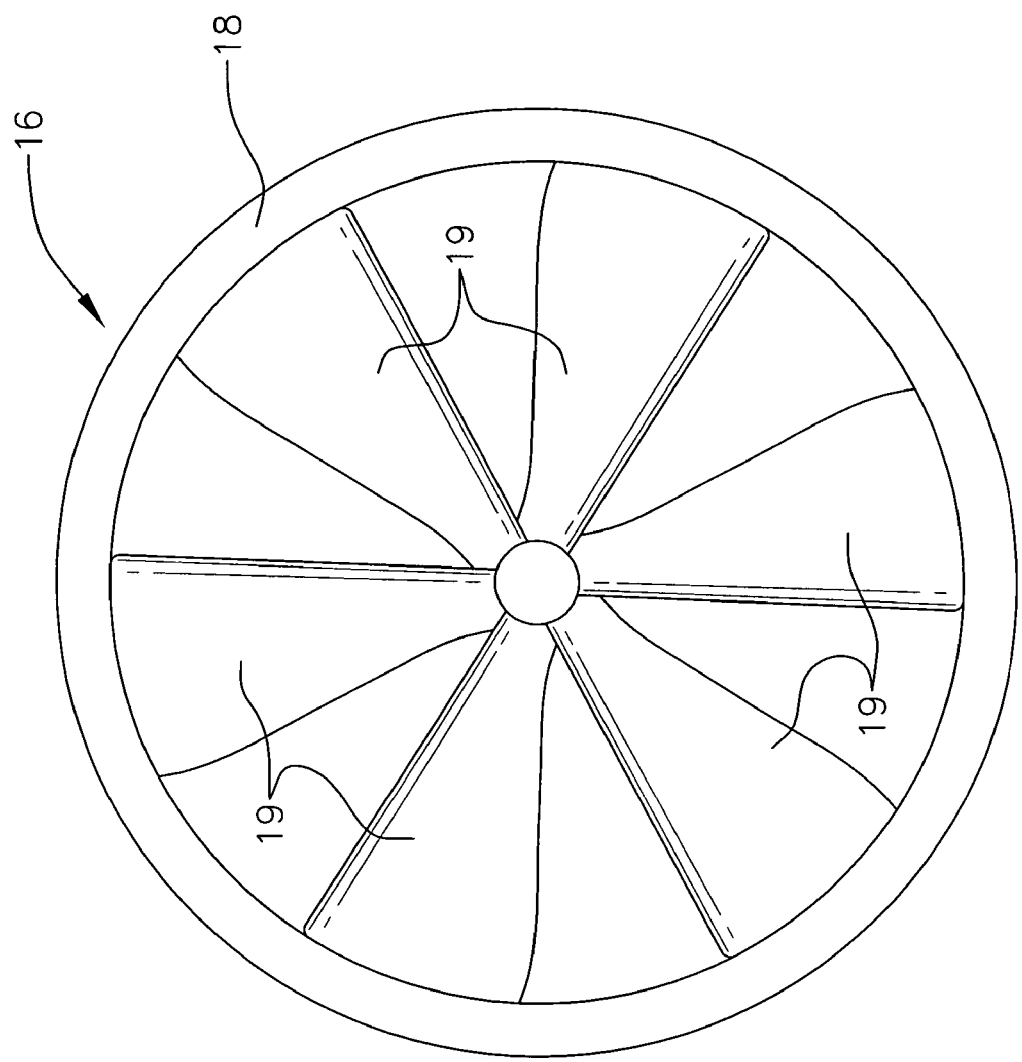
FIG. 2 is a front view of a blade and rotor-drum assembly.

FIG. 2 shows assembly 16 in greater detail, and as having an outer cylindrical rotor drum 18, with turbine blades 19 extending radially therein, and preferably integrally formed with the rotor drum. The assembly can be cast or of welded construction if made of metal (e.g., aluminum), or integrally injected molded if made from a composite material strengthened by glass, carbon, or similar reinforcing fibers. Though six blades are shown, the number of blades can be selected by the designer. Multiple blades, such as five or six, are preferred as they improve turbine efficiency, as well as increasing the rigidity of assembly 16.

Turbine-blade strength and stiffness is significantly increased by the fixed support of the blades on the drum. The assembly is stable and balanced, and can be safely operated at high wind speeds encountered in storm conditions. For smaller wind-turbine assemblies which typically operate at high rotation speeds, centrifugal force compressively loads the blades, making them less prone to fatigue failure.

Figure 3:
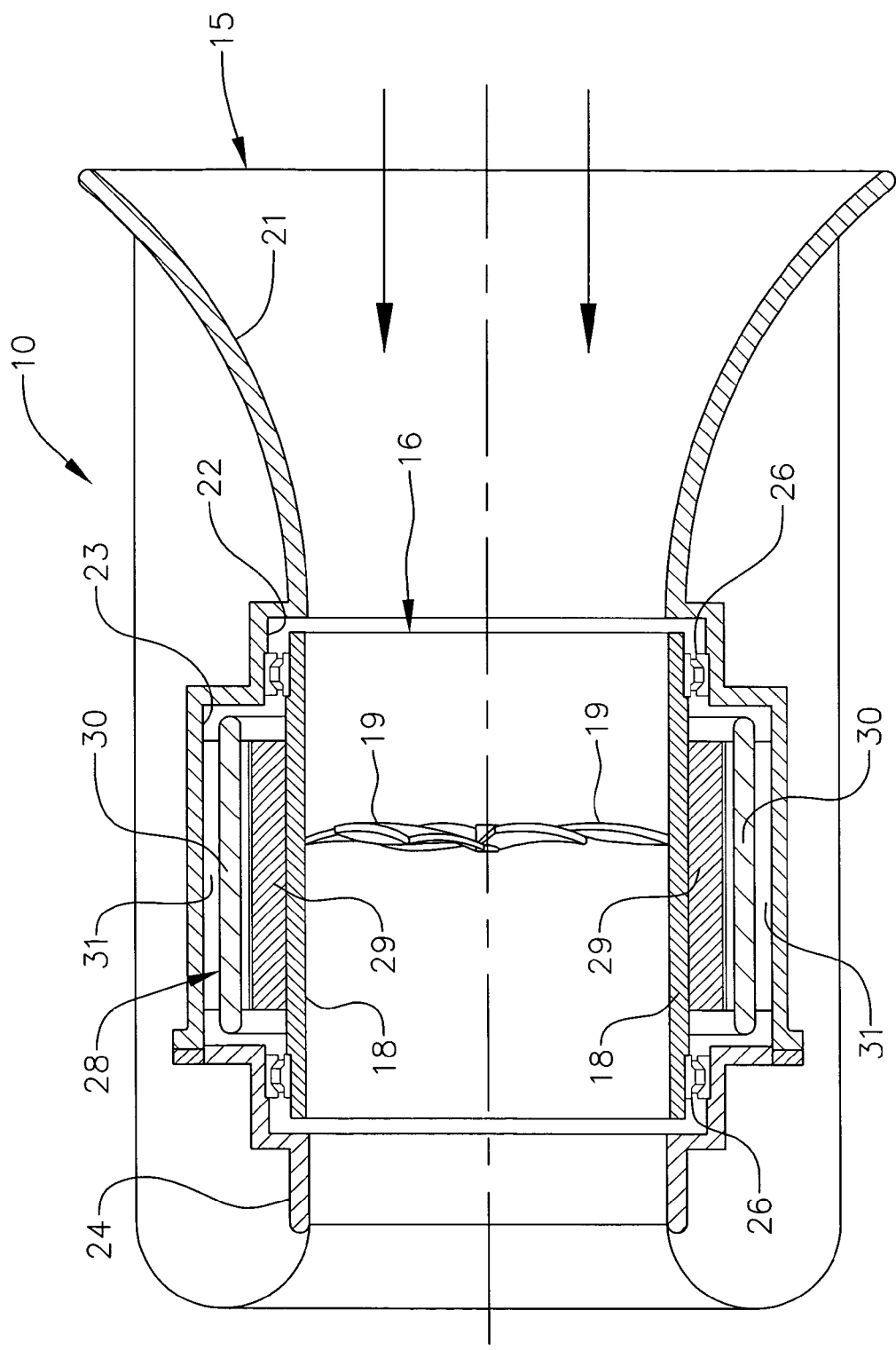
FIG. 3 is a sectional side elevation of the turbine assembly.

FIG. 3 is a sectional side elevation of one embodiment of assembly 10, and shows assembly 16 as rotatably mounted within diffuser shell 15. The diffuser shell is preferably molded from a strong composite material, and has an outwardly divergent section 21 which merges with outwardly stepped ring-shaped inner and outer cylindrical support sections 22 and 23. An end portion 24 of the diffuser shell is separately formed, and is rigidly secured to a more forward part of the diffuser shell after the blade and rotor drum is fitted therein. The outlet end of the diffuser shell may be made more divergent to optimize aerodynamic conditions.

Figure 4:
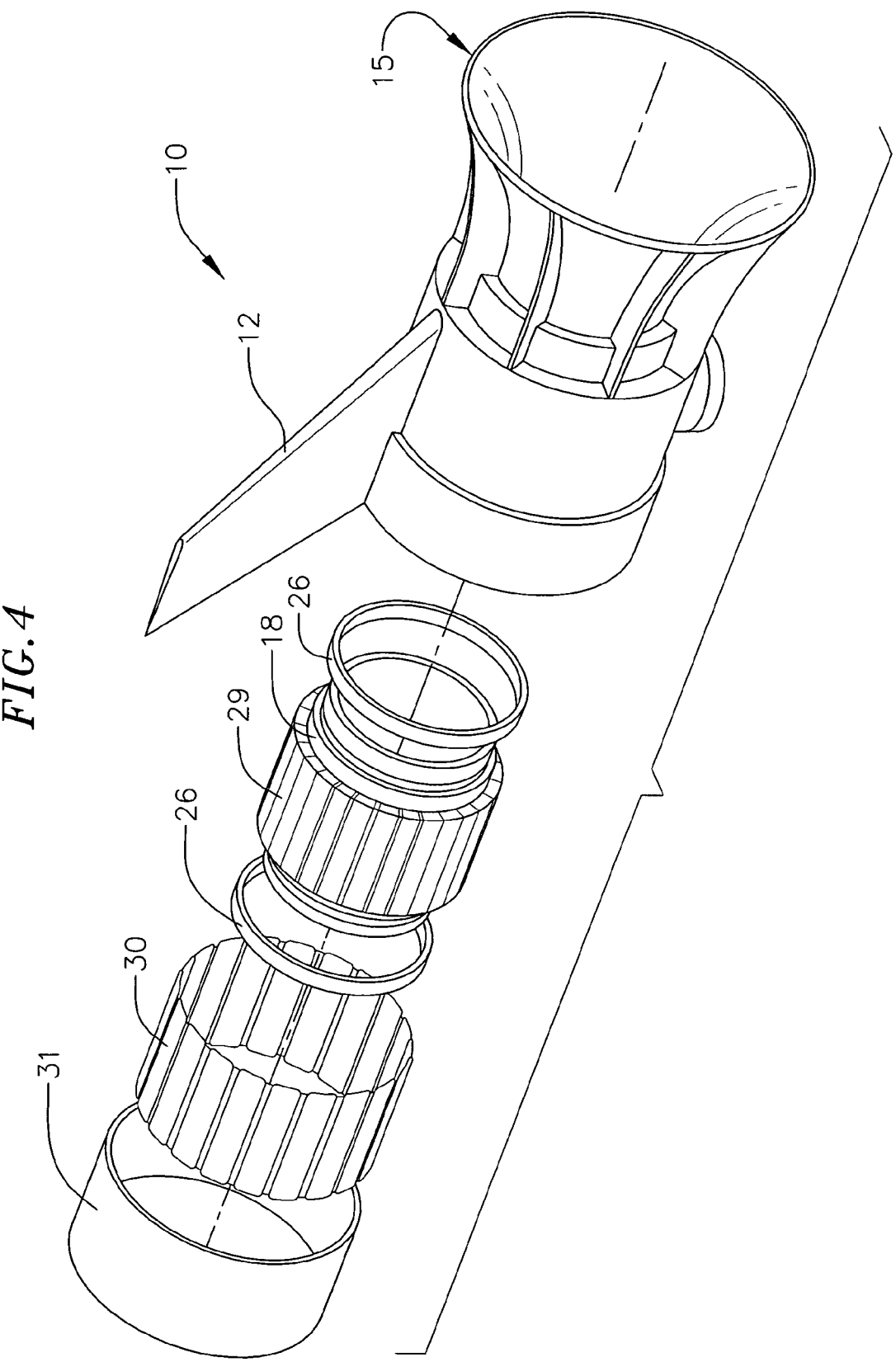
FIG. 4 is an exploded perspective view of the turbine assembly shown in FIG. 3.

A pair of spaced-apart ring-shaped bearings 26 have outer races secured to the inner surface of support section 22, and inner races secured to the outer surface of the rotor drum, thereby rotatably mounting assembly 16 within the diffuser shell. The absence of any clearance between the blade tips and the rotor drum (which forms a cylindrical part of the diffuser) is another feature eliminating tip losses, and producing high turbine efficiency. Magnetic bearings can also be used to augment bearings 26 for lower friction at high rotational speeds The embodiment shown in FIG. 3, and the exploded view of FIG. 4, positions the components of an electrical generator assembly 28 cylindrically around the rotor drum. These components include a cylindrical assembly 29 of permanent magnets secured to the outer surface of the rotor drum to rotate therewith. Slightly outwardly spaced from the magnet assembly is a cylindrical assembly 30 of stator coils secured to a support ring 31 which is in turn rigidly secured to the inner surface of support section 23.

Figure 5:
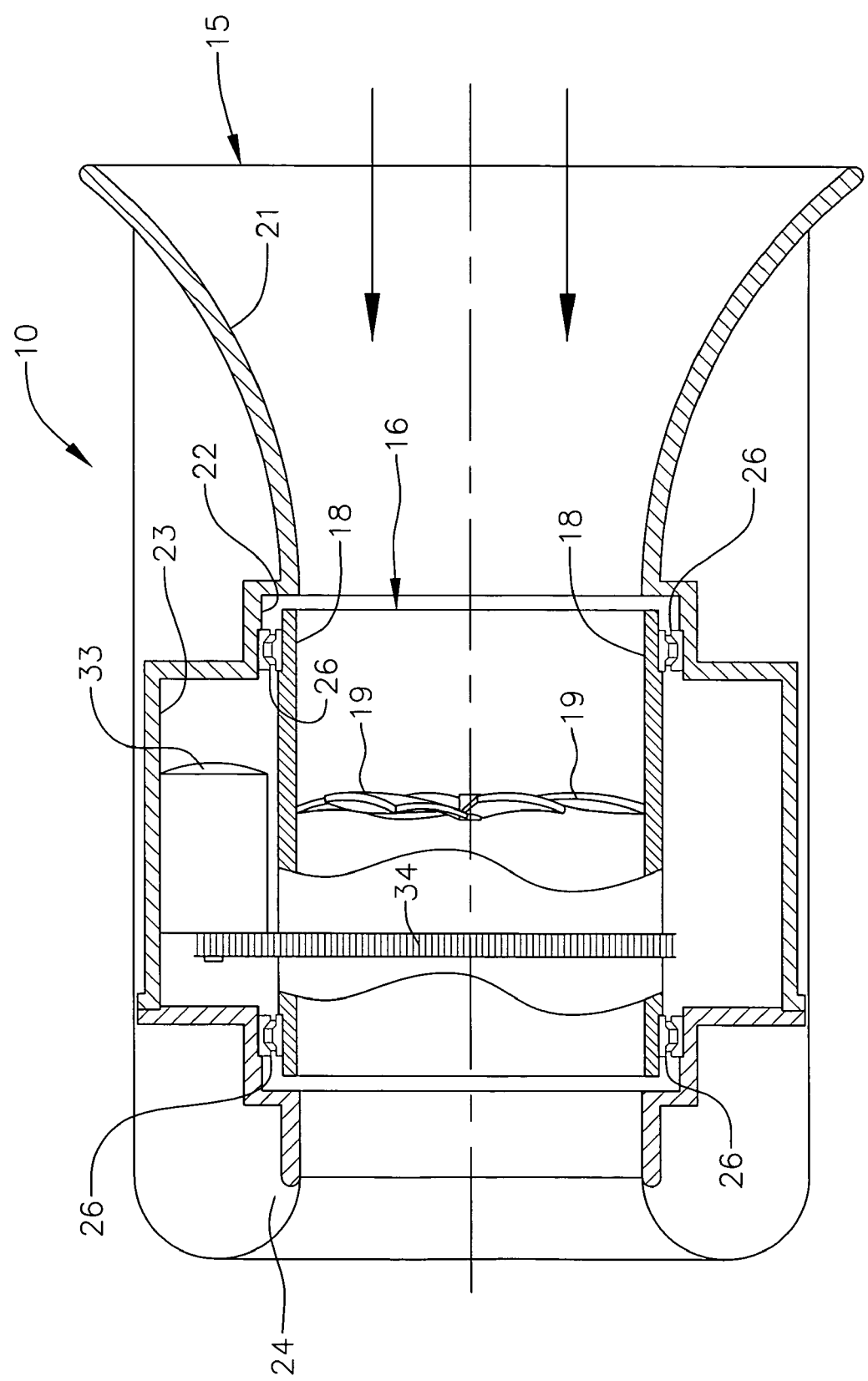
FIG. 5 is a view similar to FIG. 3, but showing a side-mounted belt-driven electrical generator.

FIG. 5 shows an alternative embodiment using a conventional drum-shaped electrical generator 33 secured at one side of support section 23. Generator 33 is driven by a flexible timing belt 34 engaged with a toothed wheel on the generator, and extending around a cylindrically toothed section of the rotor drum.

Figure 6:
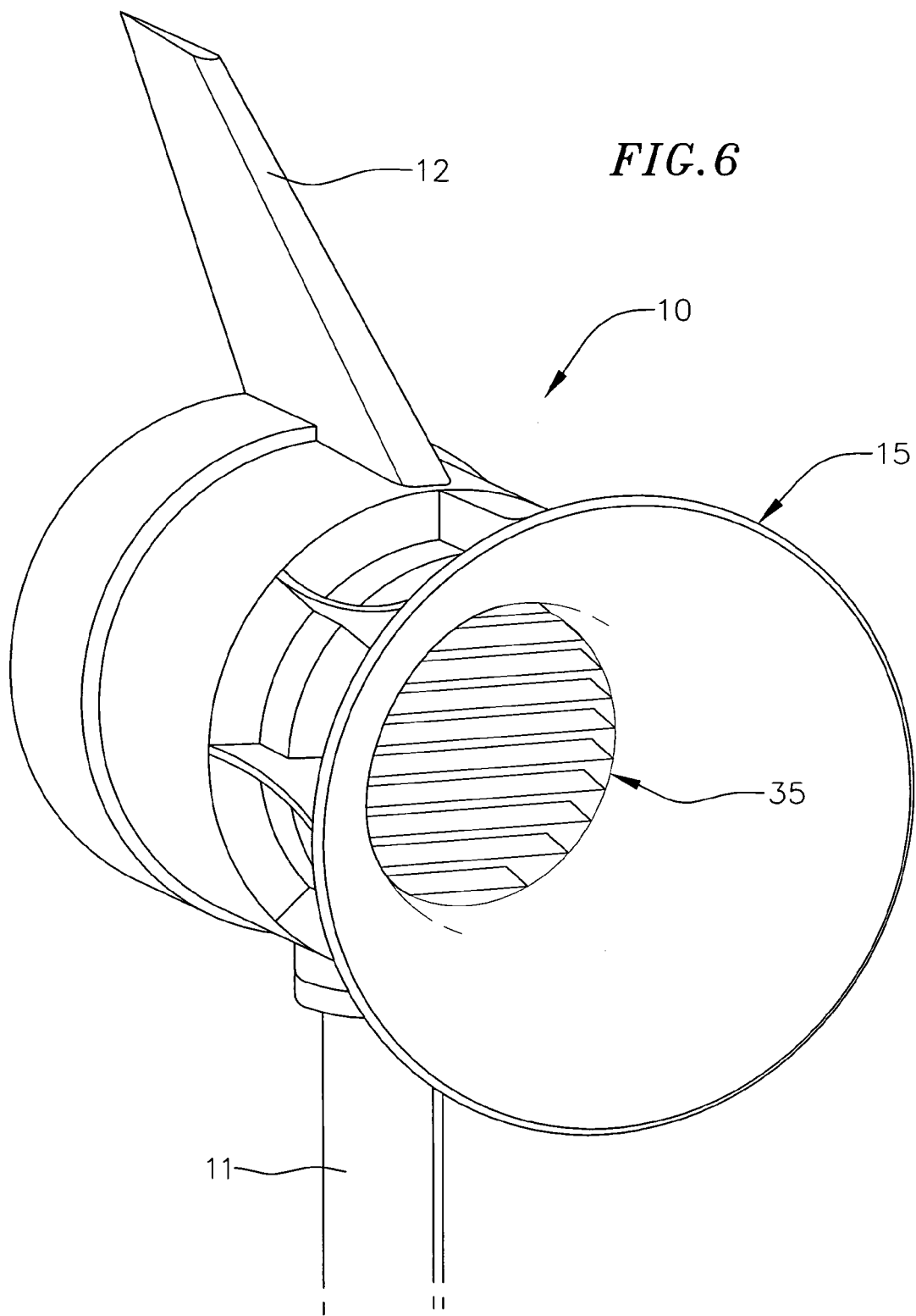
FIG. 6 is a perspective view of an embodiment using inlet guide vanes.

FIG. 6 shows another alternative embodiment using an assembly 35 of stator vanes or inlet guide vanes secured within the inner end of outwardly divergent section 21 of the diffuser shell. The use of such vanes is a known technique enabling use of fixed-pitch turbine blades, but with the advantages of more complex variable-pitch blades. The diffuser shell can also be lined with a sound-absorbing material for noise reduction during turbine operation.

Other applications on the wind-turbine assembly include "reverse" operation as a wind-generating fan, by applying electrical energy to the generator which then acts as a motor to rotate the blades. Another application involves adding blades to the outside of the rotor drum which is appropriately sealed to act as a wind-driven water pump, air compressor, or fan.

There has been described a wind-turbine assembly featuring a diffuser-supported assembly of turbine blades. The described designs are useful in both small and large wind turbines, are economical to manufacture, and operate at high efficiency.

What is claimed is:

1. A diffuser-augmented wind-turbine assembly, the assembly having a diffuser outer-housing shell with an inner cylindrical portion, a rotor drum having inner and outer surfaces, the inner surface rigidly supporting a plurality of turbine blades, and bearing means positioned between the diffuser-shell inner cylindrical portion and the rotor-drum outer surface for rotatably supporting the rotor drum, the rotor drum being in driving engagement with a rotatable electrical generator.

2. The assembly of claim 1, wherein the rotor-drum inner surface is flush with adjoining inner surfaces of the diffuser shell.

3. The assembly of claim 1, wherein the rotor drum and turbine blades are integrally formed.

4. The assembly of claim 1, wherein the electrical generator comprises a cylindrical magnet assembly secured to the outer surface of the rotor drum to rotate therewith, and a cylindrical stator-coil assembly secured to an inner surface of the diffuser shell, and extending around and slightly spaced from the magnet assembly.

5. The assembly of claim 1, wherein the bearing means comprises spaced-apart ring bearings adjacent opposite ends of the rotor drum for rotatably supporting the drum within the diffuser shell.

6. The assembly of claim 1, and further comprising a plurality of inlet guide vanes secured within an inlet end of the diffuser shell upstream of the turbine blades.

7. The assembly of claim 1, wherein the electrical generator is drum shaped, and secured to the diffuser shell radially outwardly of the rotor drum, and further comprising a flexible belt engaged with the drum and generator.

* * * * *